United States Patent
Brown

(10) Patent No.: US 9,302,729 B1
(45) Date of Patent: Apr. 5, 2016

(54) FORK TUBE EXTENSION FOR A MOTORCYCLE

(71) Applicant: Charles L. Brown, Hanceville, AL (US)

(72) Inventor: Charles L. Brown, Hanceville, AL (US)

(*) Notice: Subject to any disclaimer, the term of this patent is extended or adjusted under 35 U.S.C. 154(b) by 0 days.

(21) Appl. No.: 14/286,258

(22) Filed: May 23, 2014

Related U.S. Application Data

(60) Provisional application No. 61/926,615, filed on Jan. 13, 2014.

(51) Int. Cl.
  *B62K 21/18* (2006.01)
  *B62K 21/02* (2006.01)
  *B62K 25/08* (2006.01)
  *B62K 25/24* (2006.01)

(52) U.S. Cl.
  CPC ............. *B62K 21/02* (2013.01); *B62K 25/08* (2013.01); *B62K 25/24* (2013.01)

(58) Field of Classification Search
  CPC ......... B62K 25/08; B62K 21/02; B62K 25/24
  USPC .............................. 280/281.1, 276
  See application file for complete search history.

(56) References Cited

U.S. PATENT DOCUMENTS

| 3,556,557 | A | * | 1/1971 | Blair | 280/279 |
|---|---|---|---|---|---|
| 4,012,055 | A | | 3/1977 | Ottow | |
| 4,629,205 | A | | 12/1986 | Haynes | |
| 7,255,210 | B2 | | 8/2007 | Larsson et al. | |
| 7,938,422 | B2 | * | 5/2011 | Clari | 280/280 |
| 8,777,250 | B1 | * | 7/2014 | Yu | 280/275 |
| 2011/0204590 | A1 | * | 8/2011 | Delpit et al. | 280/276 |

FOREIGN PATENT DOCUMENTS

WO 2013066159 A1 5/2013

OTHER PUBLICATIONS

VTX-Treme 3" Fork Extensions—VTX 1300 http://xchoppers.com/product_info.php?cPath=106&products_id=1979&osCsid=g70ot8ef5c3l48933l245oj7j2 (Published Mar. 15, 2008).
http://www.billskimods.com/P3220007.JPG (Accessed Jul. 12, 2012).
http://www.bikercom.com/shop/index.php?page=pp_productos.php&tipo=1&md=1&ref=58 (Published Mar. 10, 2009).

* cited by examiner

*Primary Examiner* — Joseph Rocca
*Assistant Examiner* — Marlon Arce
(74) *Attorney, Agent, or Firm* — Robert C. Montgomery; Montgomery Patent & Design

(57) ABSTRACT

A fork tube extension for motorcycles includes a cylindrical body having a reduced outer diameter at a first end forming a shoulder. A pair of the extensions is fitted between upper triple tree and lower triple tree portions of the motorcycle fork assembly. The fork tubes are fit up into the tube extensions in bored center cavities. Set screws provided in the cylindrical body are used to removably affix the fork tubes within the extensions. The depth of the center cavities determines the length of extension added to the fork tubes.

12 Claims, 3 Drawing Sheets

FORK TUBE EXTENSION FOR A MOTORCYCLE

RELATED APPLICATIONS

The present invention was first described in and claims the benefit of U.S. Provisional Application No. 61/926,615, filed Jan. 13, 2014, the entire disclosures of which are incorporated herein by reference.

FIELD OF THE INVENTION

The present invention relates generally to a fork tube extension configured for installation on a motorcycle to extend the overall length of the motorcycle fork assembly.

BACKGROUND OF THE INVENTION

Countless Americans enjoy riding motorcycles. The feeling of freedom and pure exhilaration while cruising the countryside with the wind in your hair is a passion enjoyed by many. And, as with most passions humans have, they are constantly looking for ways to improve upon them. To this end, many people customize their motorcycles by adding accessories or painting them, but these options quickly fade into a sea of others doing the same thing. Also, there are many who are looking to customize their motorcycle, but do not want to impact the re-sale value when the time comes to sell it. Accordingly, there exists a need for a means by which a motorcycle can be modified or customized in an eye-catching manner, but also in a manner which is easy and reversible as well.

SUMMARY OF THE INVENTION

The disadvantages of the prior art are overcome by the present invention in providing a fork tube extension device for a motorcycle fork assembly. Each individual extension device comprises a cylindrical body having a proximate and a distal end. The cylindrical body includes a reduced diameter insert portion at the proximate end and a coaxial center cavity having a predetermined depth formed in the distal end. The insert portion is adapted to be received by and retained within an upper triple tree assembly of a motorcycle and the center cavity is adapted to receive and retain a fork tube of the motorcycle. The predetermined depth of the center cavity establishes the length to which the fork tube is extended. The use of the present invention allows motorcycle owners the ability to customize their motorcycle, in a manner which is quick, easy, and effective.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
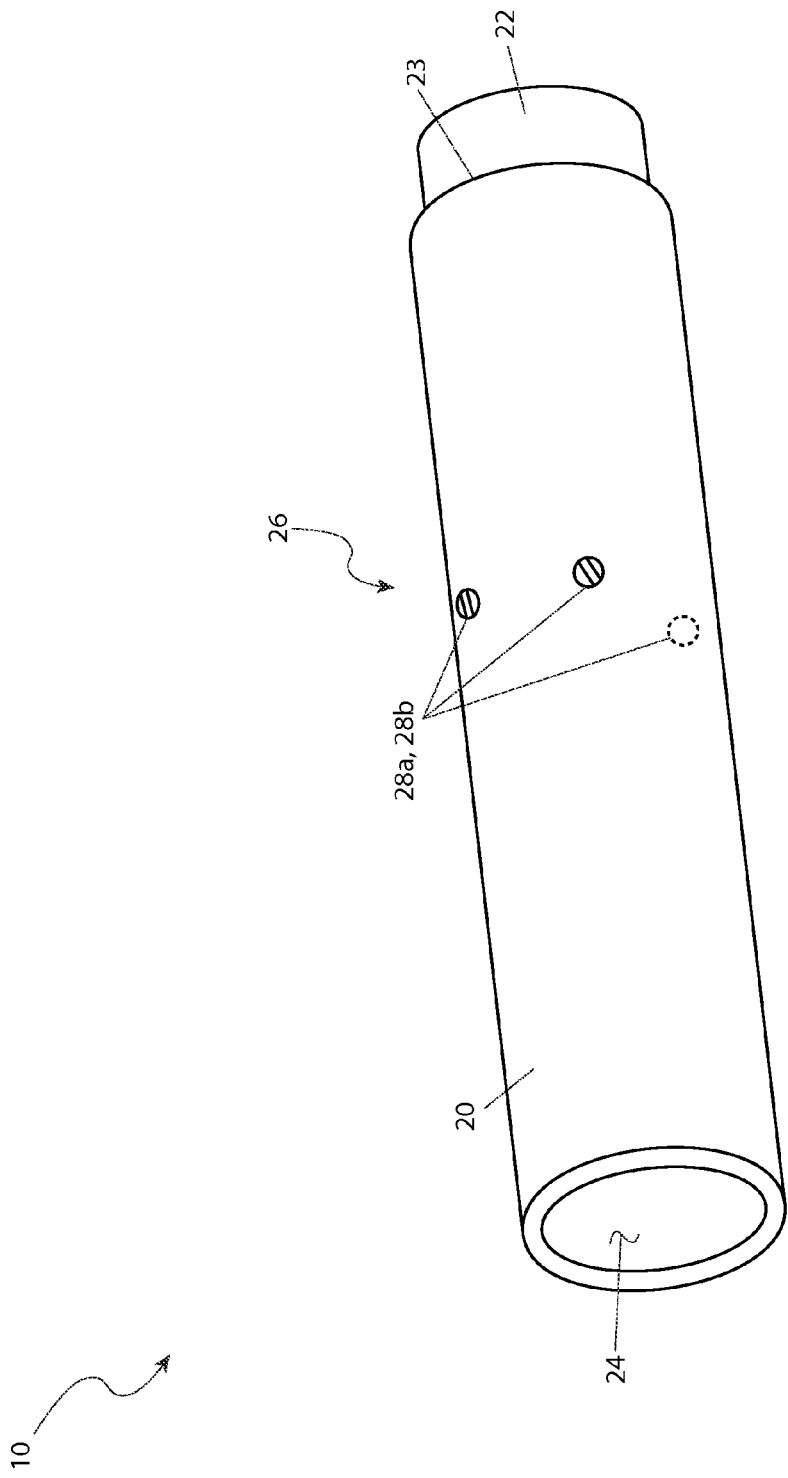
FIG. 1 is a perspective view of a fork extension for a motorcycle 10 depicting a matching pair thereof, according to a preferred embodiment of the present invention.

DESCRIPTIVE KEY 10 fork extension
20 body
22 insert portion
23 shoulder
24 center cavity
26 retainer
28a set screw
28b set screw aperture
30 cushion
100 motorcycle
101 fork tube
102 upper triple tree clamp
103 lower triple tree clamp

DETAILED DESCRIPTION OF THE PREFERRED EMBODIMENT

Figure 2:
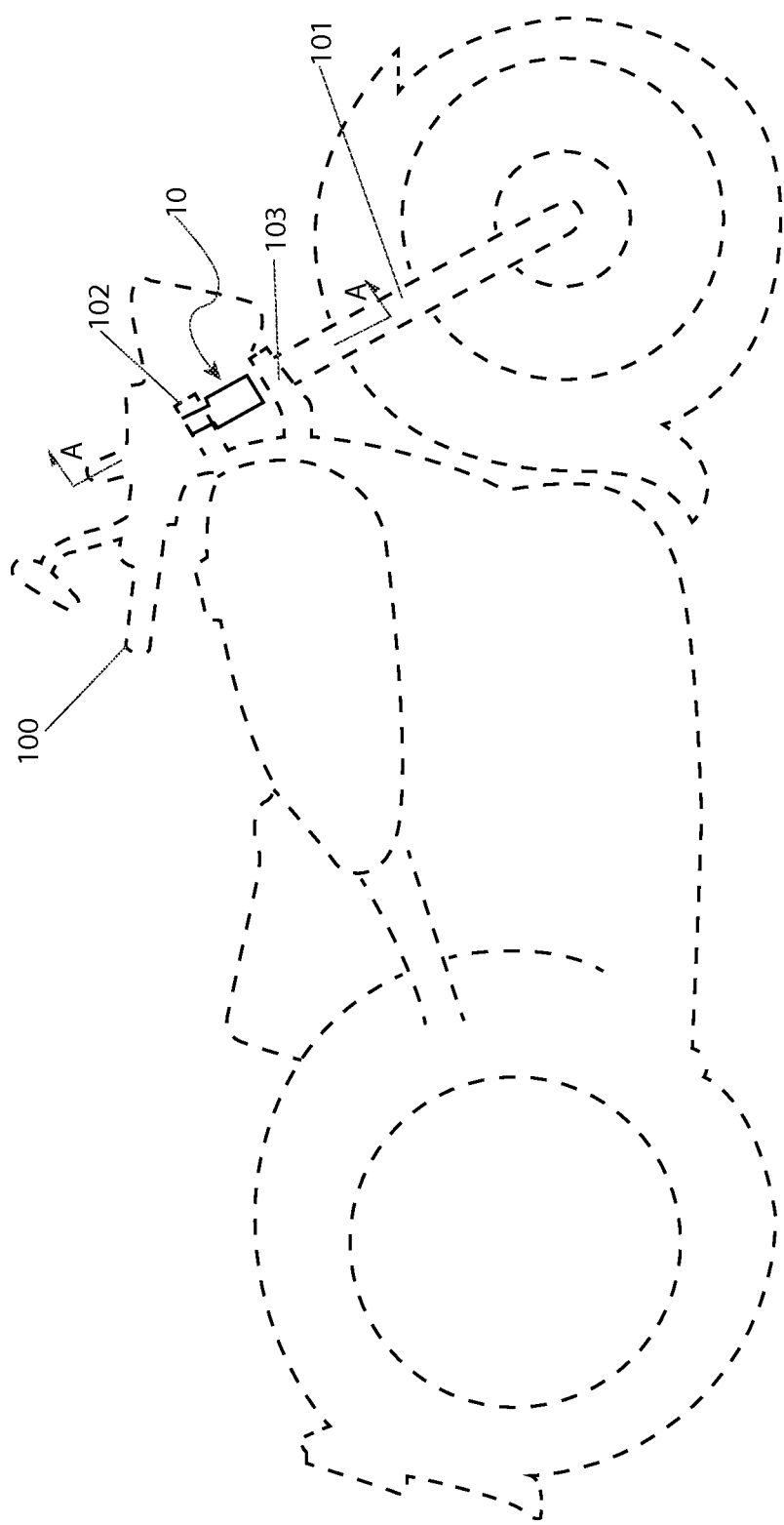
FIG. 2 is an environmental view of the fork extension 10 depicting installation upon a motorcycle 100, according to a preferred embodiment of the present invention; and, FIG. 3 is a sectional view of the fork extension 10 taken along section line A-A (see FIG. 2), according to a preferred embodiment of the present invention.
Figure 3:
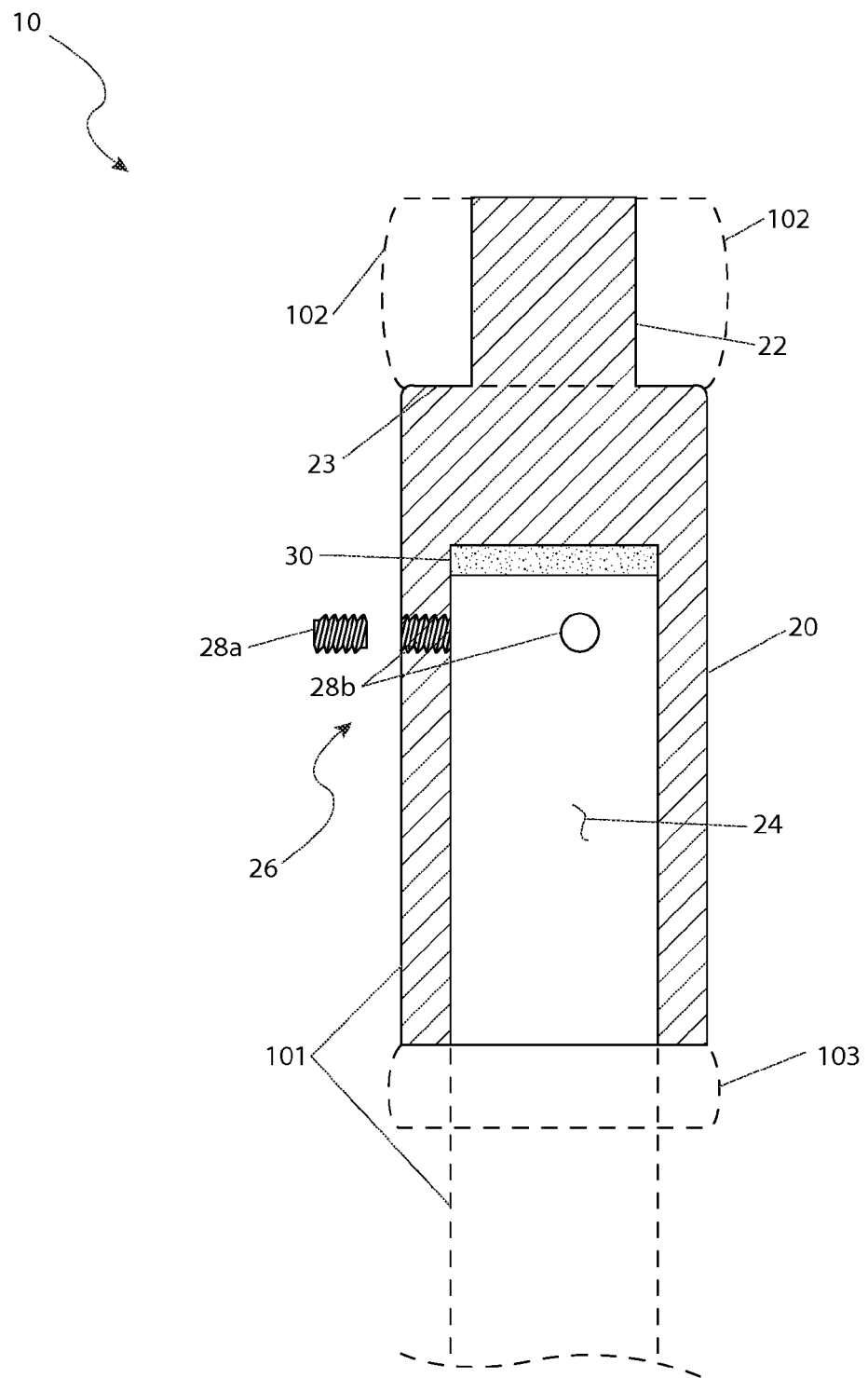

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a fork extension configured for installation on a motorcycle (herein described as the "device") 10, which provides a means to attach onto and extend the motorcycle fork tubes 101 of an existing motorcycle 100 to provide an altered appearance. The device 10 provides removable attachment to the motorcycle 100, allowing the motorcycle 100 to return to a stock configuration when desired.

Referring now to FIGS. 1 and 3, perspective and sectional views of the device 10, according to a preferred embodiment of the present invention, are disclosed. The device 10 is envisioned to be introduced for sale in pairs to provide extension of a fixed portion of a fork tube 101 on each side of a front fork assembly portion of the motorcycle 100. Each device 10 is to be geometrically identical and is preferably machined from a solid piece of aluminum, or ferrous metal to obtain maximum strength. The device 10 is envisioned to provide a surface finish which matches that of the existing fork tubes 101 such as chrome plating, flat black paint, powder coating, and the like.

The device 10 includes a cylindrical body portion 20, an insert portion 22 defining a shoulder 23, and a center cavity or bore 24. The body 20 is constructed to have an outside diameter envisioned to be similar to that of an upper fixed portion of the fork tube 101 so as to provide a continuous cylindrical profile and a nearly undetected presence when installed. The insert section 22 is located at an upper or proximate end portion of the body 20 and is formed having a diameter lesser than that of the body 20. The transition from the diameter of the body 20 to that of the insert portion 22 is set at right angles to produce the shoulder portion 23, which acts as a mechanical stop for the body 20 when installed in the fork tube 101.

More particularly, during installation, the insert section 22 is inserted into the clamp portion 102 of the upper triple tree of the motorcycle 100 where the end of the existing fork tube 101 normally would rest. The device 10 is pressed into upper the triple tree until the shoulder 23 makes contact with the clamp 102. The upper triple tree clamp 102 is envisioned to provide conventional mechanical clamping to secure the insert 22 within. At the bottom, or distal end of the body 20 a cylindrical cavity 24 is formed that is coaxial to the axis of the body 20. The center cavity 24 extends into the body 20 and has as inner diameter to slidingly receive a top end portion of the fork tube 101.

The installation of the device 10 is envisioned to result in positioning the existing fork tube 101 approximately three inches (3 in.) below its original position. However, it is understood that the length of the device 10 may be introduced in various lengths based upon a particular application as well as a user's preference, which results in a corresponding extended position of the fork tube 101. More specifically, the predetermined depth of the center cavity 24 within the body 20 defines the length of extension provided to the fork tube 101 by the device 10.

At least one retainer 26 is employed to secure the fork tube 101 within the body 20 of the device 10. The fork tube 101 is to be mechanically retained within the center cavity 24 of the device 10 via engagement of at least one, but preferably, three (3) retainers that are comprised of equally-spaced set screws 28a threadingly engaged in set screw apertures 28b. The set screw apertures 28b are machined through the body 20 into the center cavity 24. The use of the set screws 28a to retain the fork tubes 101, in conjunction with the profile matching of the device 10 to the fork tubes 101 and the triple tree components are intended to minimally detract from, if not enhance, the aesthetics of the motorcycle 100.

The device 10 also includes a cushion 30 which is to be located within the center cavity 24. The cushion 30 protects an upper end portion of the existing fork tube 101 from any possible mechanical damage resulting from contact with a bottom surface portion of the center cavity 24. The cushion 30 is envisioned to comprise a disc-shaped protective layer made using a resilient material such as rubber, plastic, dense foam, or similar material.

Referring now to FIG. 2, an environmental view of the device 10 depicting installation upon a motorcycle 100, according to a preferred embodiment of the present invention, is disclosed. The device 10 is envisioned to be used in matching pairs with one (1) unit of the device 10 used on each side of the front fork assembly of the motorcycle 100. Each device 10 is sized to allow both the proximal and distal end of the device 10 to engage within existing factory motorcycle connections via a slip-fit. The device 10 is shown here being utilized upon a HARLEY-DAVIDSON SPORTSTER®-style motorcycle 100 for illustration purposes; however, it is envisioned that the portions of the body 20 could be modified for use on various styles, makes, and models of motorcycles 100 without deviating from the teachings of the invention, and as such should not be interpreted as a limiting factor. In the event that the device 10 is no longer needed to extend the forks 101, the device 10 is simply removed allowing the motorcycle to return to a stock factory configuration.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 2 and 3. The method of installing and utilizing the device 10 may be achieved by performing the following steps: procuring a matching pair of the devices 10 having a desired finish and being particularly sized for application upon a desired existing motorcycle 100; elevating and supporting the existing motorcycle 100 upon a lift or stand such that the wheel portions are above a ground surface; freeing the forks 101 by loosening the existing triple tree clamping portions 102, 103; lowering both forks 101 a sufficient distance in a downward direction to allow insertion of the devices 10 between the upper triple tree clamp 102 and insert section 22 portions; inserting an upper end portion of the existing forks 101 into respective center cavity portions 24 of the devices 10 until contacting the respective cushions 30; sliding the forks 101 upwardly within the lower triple tree clamp 103 until the insert section 22 of the devices 10 are fully engaged into the upper triple tree clamp 103 and contacting the shoulder portion 23; tightening the upper 102 and lower 103 triple tree clamping portions around the insert section 22 and existing fork tube 101 portions, respectively; installing the set screws 25a into respective set screw apertures 25b, if not previously installed; applying a torque upon the set screws 25a until contacting and sufficiently impinging upon outer surfaces of the existing forks 101 using a common hand tool; removing the motorcycle 100 from the lift; utilizing the motorcycle 100 for riding in a normal manner; and, benefiting from an altered appearance of a motorcycle 100 having extended fork portions 101 afforded a user of the present invention 10. The devices 10 may be removed and the motorcycle 100 returned to a factory stock configuration by performing the steps listed above in a reversed order.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A fork tube extension device configured for installation on a motorcycle comprising:
    a cylindrical body having a proximate end, a distal end, a threaded aperture and further comprising an insert portion at said proximate end adapted to be retained within an upper triple tree assembly of a motorcycle, and a coaxial center cavity formed in said distal end and adapted to receive and retain a fork tube of the motorcycle so as to extend the effective length of the fork tube, said cavity forming a sidewall and wherein said threaded aperture passes through said sidewall;
    a cushion in the top of said center cavity for preventing direct contact of the fork tube with the bottom of said center cavity; and,
    a retainer threaded into said threaded aperture for clamping a fork tube to said body.

2. The device of claim 1, wherein said insert portion further comprises a reduced diameter portion in said cylindrical body, wherein said reduced diameter is formed at right angles to said cylindrical body to define a shoulder on said cylindrical body.

3. The device of claim 1, wherein said center cavity further comprises a center cavity of a predetermined depth;
   wherein said fork tube is received in said cylindrical body to said predetermined depth; and,
   wherein said predetermined depth determines said effective length of extension in said fork tube.

4. The device of claim 1, wherein said cushion is comprised of one of a group of resilient materials that includes rubber, plastic, and dense foam.

5. The device of claim 1, wherein said retainer comprises a set screw.

6. A fork tube extension device configured for installation on a motorcycle comprising:
   a cylindrical body having a proximate and a distal end, further comprising a reduced diameter insert portion at said proximate end, a coaxial center cavity having a predetermined depth formed in said distal end so as to form a sidewall, and a threaded aperture passing through said sidewall;
   a cushion in the top of said center cavity;
   a retainer threaded into said threaded aperture; and,
   wherein said insert portion is adapted to be received by and retained within an upper triple tree assembly of said motorcycle;
   wherein said center cavity is adapted to receive a fork tube of said motorcycle such that said cushion prevents direct contact of the fork tube with the bottom of said center cavity; and,
   wherein said predetermined depth of said center cavity establishes a length to which said fork tube is extended, and
   wherein said retainer is for clamping a fork tube to said body.

7. The device of claim 6, wherein said reduced diameter portion is formed at right angles to said cylindrical body to define a shoulder on said cylindrical body.

8. The device of claim 7, wherein said retainer is a set screw.

9. A fork tube extension device configured for installation on a motorcycle comprising:
   a pair of cylindrical bodies each having a proximate and a distal end, an insert portion at said proximate end, and a coaxial center cavity formed in said distal end forming a sidewall, and a threaded aperture that passes through said sidewall;
   a retainer threaded into said aperture of each cylindrical body; and,
   a cushion in the top of each said center cavity;
   wherein each said insert portion is adapted to be received by and retained within an upper triple tree assembly of said motorcycle;
   wherein each said center cavity is adapted to receive and retain an individual fork tube of said motorcycle fork assembly to extend an effective length of said fork assembly; and
   wherein each said cushion prevents direct contact of the top of the fork tube with the bottom of the cavity.

10. The device of claim 9, wherein each said insert portion further comprises a reduced diameter portion in said cylindrical body, wherein each said reduced diameter is formed at right angles to said cylindrical body to define a shoulder on each said cylindrical body.

11. The device of claim 9, wherein each said center cavity further comprises a center cavity of a predetermined depth;
   wherein a said individual fork tube is received in each said cylindrical body to said predetermined depth; and,
   wherein said predetermined depth determines said effective length of extension in said motorcycle fork assembly.

12. The device of claim 9, wherein each said cushion is comprised of one of a group of resilient materials that includes rubber, plastic, and dense foam.

* * * * *